June 4, 1946.  A. D. SIEDLE  2,401,385

REFRIGERATION

Filed July 15, 1942

INVENTOR
Arnold D. Siedle
BY
Harry S. Demarss
ATTORNEY

Patented June 4, 1946

2,401,385

UNITED STATES PATENT OFFICE 2,401,385

REFRIGERATION

Arnold D. Siedle, Cleveland Heights, Ohio, assignor to The Hoover Company, North Canton, Ohio, a corporation of Ohio Application July 15, 1942, Serial No. 450,975

15 Claims. (Cl. 62—5)

This application relates to the art of refrigeration and more particularly to a three-fluid absorption refrigerating system of the type in which certain mediums in the system are circulated by a power operated element.

In three-fluid absorption refrigerating apparatuses of the three-fluid type utilizing a power operated fluid circulator, it has been found that an appreciable time lapse occurs between energization of the system in response to demand for refrigeration and production of refrigerant vapor in the boiler. This time lapse is accentuated if the solution is allowed to circulate during this period as partially warmed rich solution is then withdrawn from the boiler, cooled in the absorber and flows back into the boiler, thus prolonging the warming-up period.

Accordingly, it is a principal object of the present invention to provide a refrigerating system of the above-identified character characterized by the provision of a power-operated element for circulating the absorption solution and inert gas coupled with means to prevent circulation of the solution after energization of the circulator in response to a demand for refrigeration until a condition of the system indicating the evolution of refrigerant vapor in the generator has removed the blocking means from control of solution circulation.

It is a further object of the present invention to provide a system of the above-identified character particularly characterized by the provision of means for flowing solution through the absorber during the warming up period to remove vapor from the inert gas produced by evaporation of refrigerant trapped in the evaporator at the end of a previous operative cycle but without allowing the withdrawal of solution from the generator during this period which would tend to lengthen the warming up period of the apparatus.

Other objects and advantages of the invention will become apparent as the description proceeds when taken in connection with the accompanying drawing, in which—

Figures 1, 2, 3, 4:
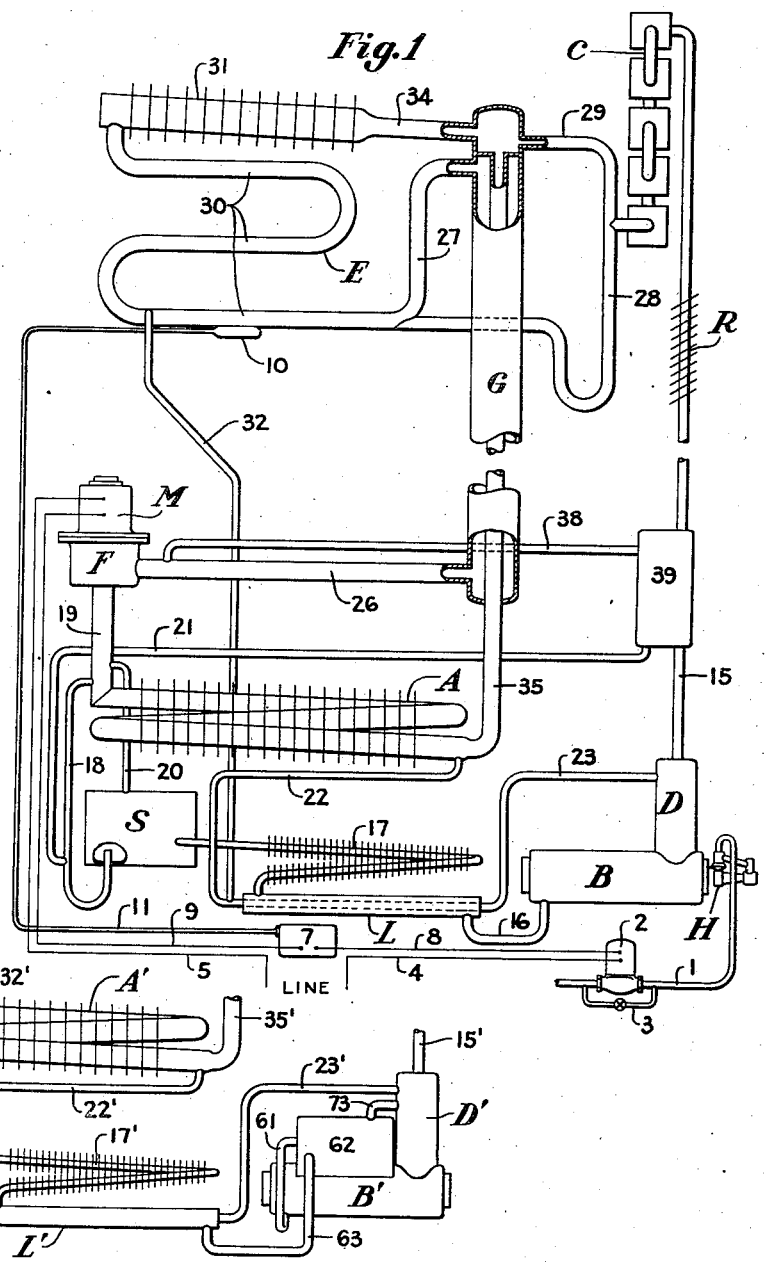
Figure 1 is a diagrammatic representation of an absorption refrigerating apparatus embodying the present invention.
Figure 2 is a detail sectional view on an enlarged scale of a portion of the apparatus of Figure 1.
Figure 3 is a fragmentary diagrammatic representation of a modified form of the invention.
Figure 4 is a detail sectional view on an enlarged scale of a portion of the apparatus in Figure 3.

Referring now to the drawing in detail, and first to Figures 1 and 2 thereof, there is illustrated a three-fluid absorption refrigerating apparatus comprising a generator B, an analyzer D, an air-cooled rectifier R, a tubular air-cooled condenser C, an evaporating element E, a gas heat exchanger G, a tubular air-cooled absorber A, a liquid heat exchanger L, a solution reservoir S and a circulating fan or pump F which is driven by an electrical motor M. These elements are suitably interconnected by various conduits to be described more fully hereinafter to form a plurality of fluid circuits constituting a complete refrigerating system.

The refrigerating system will be charged with a refrigerant such as ammonia, an absorbent, such as water, and an inert pressure equalizing medium which in the case of the illustrated form of the invention is preferably a dense gas like nitrogen.

A gas burner structure H is provided for applying heat to the boiler B. Gas is supplied to the burner H through conduit I which is under the control of a solenoid valve 2. A pilot flame by-pass 3 is provided around the valve 2 to maintain a small ignition flame on the burner H.

Electrical energy is supplied to the apparatus from the line wires 4 and 5. The line wire 4 connects directly to the solenoid valve 2 and the line wire 5 directly to the circulating fan drive motor M. The solenoid valve 2 is connected to a control mechanism 7 by a line 8 and the motor M is connected to the control 7 by a line 9. The control 7 is arranged to be responsive to evaporator temperature, as illustrated, though it may also be responsive to air temperature within the refrigerated space by means of a bulb element 10 which connects through a capillary tube 11 with a suitable bellows and switch mechanism of known type housed within the chamber 7. A preferred form of the control mechanism 7 is illustrated and described in U. S. Letters Patent No. 2,228,343, dated January 14, 1941.

Thus, in response to a demand for refrigeration the circuit is closed by the mechanism 7 between the lines 8 and 9 and the solenoid valve is energized to open position to allow full flow of gas to the burner H and the motor M is placed in operation.

The application of heat to the generator B causes evolution of refrigerant vapor from the strong solution therein contained. The vapor so produced passes upwardly through the analyzer D in contact with strong solution returning from the absorber in a manner to be described hereinafter. The resulting vapors are conducted from the upper portion of the analyzer D to the upper portion of the condenser C by a conduit 15 which includes the rectifier R.

The lean solution formed in the boiler by the evolution of refrigerant vapor is conveyed therefrom to the solution reservoir S by means of the conduit 16, liquid heat exchanger L, and finned looped pre-cooling conduit 17. A gas lift pump conduit 18 is connected between the lower portion of the reservoir S and the lower end of the suction conduit 19 of the circulating fan F. The conduit 19 opens into the upper portion of the absorber A. The upper or gas space of the reservoir S is vented by conduit 20 to the suction conduit 19 of the circulating fan F. Pumping gas is supplied to the conduit 18 below the liquid level normally prevailing therein through a conduit 21 which receives gas in a manner to be described hereinafter.

The lean solution which discharges into conduit 19 from gas lift pump conduit 18 flows downwardly through the tubular absorber A in contact with and in counterflow relationship with inert gas containing refrigerant vapor. The solution absorbs refrigerant vapor from the inert gas and the resulting heat of absorption is rejected to cooling air flowing in contact with heat rejecting fins provided on the exterior walls of the absorber conduit. The rich solution formed in the absorber flows to the bottom portion thereof from which it is conveyed by conduit 22, liquid heat exchanger L, and conduit 23 to the upper portion of the analyzer D from which it flows downwardly into the boiler B, thus completing the solution circuit.

The lean inert gas formed in the absorber flows upwardly through the conduit 19 into the circulating fan or pump F wherein it is placed under pressure. The gas under pressure is then conveyed to the lower portion of the evaporator E by way of conduit 26, the outer path of the gas heat exchanger G and the evaporator gas supply conduit 27.

The refrigerant vapor which is supplied to the condenser C through conduit 15 is condensed therein by being in heat exchange relationship with atmospheric air and the resulting condensate gravitates to the bottom of the condenser from which point it is conveyed to the bottom portion of the evaporator E adjacent its junction with conduit 27 by way of conduit 28 which includes a U-shaped liquid seal forming portion. The condenser side of conduit 28 is vented by conduit 29 to the rich gas side of the gas heat exchanger.

The condensate supplied through conduit 28 to the lower portion of the evaporator E meets the inert gas flowing through the conduit 27. The gas is traveling with sufficient velocity and pressure to distribute the liquid refrigerant throughout the looped conduit portion 30 of the evaporator E and to discharge some of the condensate into the enlarged finned air cooling portion 31 of the evaporator E. As the liquid is thus being distributed or propelled through the evaporator by the inert gas, the liquid is also evaporating into the inert gas to produce a refrigerating effect. The upper portion of the lowermost section 30 of the evaporator E is provided with an overflow conduit 32 which is connected to the rich solution return conduit 22 of the absorber. The purpose of the conduit 32 is not to purge the evaporator of non-condensible materials but to limit the liquid level which can be maintained in the bottom or lowest conduit of the evaporator to a value below that which will form a complete gas seal in that conduit. Non-volatile matter which is discharged in the evaporator from the condenser is simply propelled upwardly into the conduit 30 of the evaporator and then drains into the gas heat exchanger and flows through the inert gas circuit to the absorber where it returns to the solution circuit.

The enriched inert gas and non-volatile material which pass through the evaporator exits from the section 31 of the evaporator through conduit 34 to the inner or rich gas pass of the gas heat exchanger G from which it is then conveyed by the conduit 35 to the bottom portion of the absorber. In the lower portion of the absorber the non-volatile material joins with the rich solution that is thus returned to the solution circuit and the inert gas then flows upwardly through the absorber in contact with the solution in a manner heretofore described.

A small amount of inert gas under pressure for the gas lift pump 18 is removed from the gas discharge conduit 26 of the circulating fan F by a conduit 38 which discharges into an hermetically sealed casing 39 surrounding a portion of conduit 15. The gas supply connection 21 to the conduit 18 also opens into the housing 39 (see Figure 2).

Referring now to Figure 2 it is apparent that the conduits 21 and 38 open into the interior of the hermetically sealed casing 39. The casing 39 houses a snap-acting valve mechanism for controlling the communication between the interior of casing 39 and conduit 38, as will now be described. A suitable supporting bracket 40 is secured to a wall of casing 39 adjacent the conduit 15 and serves to support a bi-metallic thermostatic element 41 which is positioned in close proximity to the conduit 15 so as to be effected by the temperature thereof. The free or flexing end of thermostat 41 carries an actuating link 42 which engages the actuating arm 43 of a snap-acting mechanism of well-known type which is illustrated at 44. The actuated arm 45 of snap-acting mechanism 44 carries a sealing disc 46 which is adapted to abut the open end of conduit 38 within casing 39 and to prevent flow of gas into the casing 39 from conduit 38. The supporting plate 40 is provided with a stop lug 47 against which the actuated arm 45 of the snap-acting mechanism will abut when the thermostat has actuated the snap-acting mechanism to remove the sealing disc 46 from contact with the open end of conduit 38.

In the operation of this form of the invention a demand for refrigeration will be evidenced by an increase in temperature of the evaporator which will act upon the control mechanism 7 through the bulb 10 and capillary tube 11, causing closure of the circuit which will energize the solenoid valve 2 and motor M thus conditioning the system for operation. Immediately the motor M is energized inert gas will flow through the inert gas circuit including the evaporator, gas heat exchanger and absorber and will produce an initial refrigerating effect in the evaporator E by evaporating refrigerant which collected in the lower portion of the evaporator E up to the level of its point of connection with conduit 32 after completion of a previous operative cycle of the machine. The energization of the burner H for full flame operation will at the same time apply heat to the boiler B and its contents. However, when the apparatus is initially energized for operation the contents of the boiler B will be cool and a period of time will elapse before refrigerant vapor will be evolved therefrom. Similarly the conduit 15 will be in a cool condition which will cause the thermostat 41 to flex to the position illustrated in Figure 2 which will place the disc 46 in contact with the open end of the conduit 38, thus blocking flow of inert gas through conduit 38, chamber 39 and conduit 21 to the solution circulating gas lift pump 18. As a consequence of this, there will be no solution circulation when the apparatus is initially energized.

Due to the lack of solution circulation when the apparatus is initially energized the liquid in the boiler B and lower portion of the analyzer D will be in a static condition and will therefore quickly heat up to the boiling point and evolution of refrigerant vapor will occur within a short period of time. As refrigerant vapor is evolved and passes upwardly through conduit 15 enroute to the rectifier R and condenser C the temperature of that conduit will be raised which will heat the thermostat 41 sufficiently to cause the same to flex to the right, as viewed in Figure 2, which will actuate the snap-acting mechanism 44 to remove the disc 46 from contact with the conduit 38. When this occurs inert gas will flow through conduit 38, chamber 39 and conduit 21 into gas lift pump 18 and will then begin elevating absorbing solution into the absorber as described previously. As soon as absorption solution begins to pass through conduit 18 from reservoir S solution will begin to flow from the boiler into this reservoir and the normal circulation of absorption solution through its circuit will begin.

This initial delay between energization of the apparatus by the control mechanism and circulation of absorption solution is carried out with respect to the production of refrigeration by the refrigerant which has collected in the lower portion of the evaporator E at the termination of a previous operative cycle. This delay period also allows the boiler to heat up and effects a considerable saving in energy as partially warm solution is not immediately withdrawn from the boiler, cooled in the absorber and returned thereto. It is to be noted that the control of the solution circulation is made directly responsive to a condition of the system produced as an incident of evolution of refrigerant vapor from the boiler so that solution circulation does not begin until the boiler is in a condition to render circulation of solution necessary and desirable for effective operation of the system.

Referring now to Figures 3 and 4 there is illustrated a modified form of the invention which is identical with the form of the invention illustrated and described above in connection with Figures 1 and 2 except in certain particulars to be hereinafter noted. Such portions of the apparatus of Figures 1 and 2 are identical with apparatus previously illustrated and described in connection with Figures 1 and 2 and they are therefore given the same reference characters distinguished by the addition of a prime.

In this form of the invention inert gas for operating the circulating pump 18' is conveyed directly from the gas discharge conduit 26' of the circulating fan F' to the pump 18' by a conduit 60. There are no means in connection with conduit 15' corresponding to the casing 39 and its associated mechanism of Figures 1 and 2.

In this form of the invention the lean solution formed in the boiler B' by the evolution of refrigerant vapor is removed therefrom through the conduit 61 into a valve casing 62 which is mounted on the upper portion of the boiler B'. The valve casing 62 is provided interiorly thereof at its left hand end with a dam 64 arranged to catch the liquid flowing into casing 62 through conduit 61. The liquid is removed from the area defined by the left hand end of casing 62 and dam 64 to the solution reservoir S' by way of the conduit 63, the liquid heat exchanger L' and the finned looped pre-cooling conduit 17'. The conduit 63 extends upwardly into the chamber 62 to approximately the liquid level maintained in the analyzer, so that the liquid will flow through conduit 61 at a rate proportionate to the rate at which fresh liquid is supplied from the absorber to the analyzer D' through conduit 23'.

Interiorly of the chamber 62 there is mounted a bracket 65 which supports a bi-metallic thermostatic element 66 adjacent the upper wall of the boiler and in position to be influenced by the temperature thereof. The outer end of bi-metal 66 carries a link 67 which is connected to an actuating arm 68 of a known type of snap-acting mechanism indicated at 69. The actuated arm 70 of the snap-acting mechanism 69 carries on its outer end a valve plate or disc 71 in position to contact the open upper end of conduit 63 and thus prevent solution flow therethrough. A suitable stop 72 is provided to limit the movement of the actuated arm 70 of the snap-acting mechanism when the thermostat 66 actuates the same in a direction to remove the plate 71 from contact with the upper end of conduit 63. The chamber 62 is vented by means of a vent conduit 73 to the upper vapor containing space of the analyzer D'.

The operation of this form of the invention is as follows: When the apparatus is energized in response to a demand for refrigeration, the boiler will be at a low temperature as a consequence of which the thermostat 66 will have flexed to urge the plate 71 into contact with the open end of conduit 63 and solution flow will be impossible. The heater for the boiler B and the circulating fan motor will, however, be energized and the contents of the boiler will be heated while the inert gas circulates. The circulation of the inert gas will evaporate residual refrigerant trapped in the lower portion of the evaporator below the level of its point of connection to conduit 32' which will produce a refrigerating effect to carry the apparatus until the boiler goes into full operation and supplies fresh refrigerant. Also due to the fact that the gas is circulating and gas is being supplied to the conduit 60 from conduit 26' solution will be removed from the reservoir S' and elevated into the absorber which will serve to absorb refrigerant vapor from the inert gas to sustain the carry over refrigerating effect. Some of this solution will find its way through conduit 23' into the boiler and will raise the level therein slightly. It is for this reason that the dam 64 extends to a height above the normal solution level in the boiler-analyzer system. However, since no solution is being withdrawn from the boiler B' the same will heat up fairly rapidly and there will be no loss of heat due to removal of warm solution and cooling of the same in the absorber, such as is characteristic of prior systems.

By the structures disclosed as exemplifications of the present invention means are provided by which the heater for the boiler and the fluid circulating elements of the system are simultaneously energized which will cause heating of the contents of the boiler and circulation of inert gas, but additional means are provided which prevent circulation of solution until the same is allowed by mechanism which is responsive to a condition produced as an incident to evolution of refrigerant vapor from the generator. By this means the boiler is heated rapidly as no heat is lost due to liquid being withdrawn therefrom, cooled in the absorber and then returned to the boiler. During the interim period a carry-over refrigerating effect is produced by liquid refrigerant which remains in the evaporator after the termination of a previous operative cycle and also in part by liquid which discharges from the condenser into the evaporator after termination of an operative cycle of the system.

While the invention has been illustrated and described in detail it is not to be limited thereto but various changes may be made in the construction, design and arrangement of parts without departing from the spirit of the invention or the scope of the appended claims.

I claim:

1. Absorption refrigerating apparatus comprising a boiler, an evaporator, a liquefier and an absorber connected to provide for circulation of a plurality of fluids, a fluid circulating device, means for heating said boiler, refrigeration demand responsive means for energizing said circulating device and said heater in response to a demand for refrigeration, means for preventing circulation of fluid through said boiler, and means responsive to a condition produced as an incident to operation of said boiler for rendering said circulation preventing means inoperative.

2. Absorption refrigerating apparatus comprising an inert gas circuit including an evaporator and an absorber, a solution circuit including a generator and said absorber, means for liquefying refrigerant vapor produced in said generator and for supplying the liquefied refrigerant to said evaporator, means for heating said generator, means for circulating inert gas and solution through said inert gas and solution circuit respectively, control means for controlling said heating and circulating means, means arranged to prevent circulation of solution through said solution circuit, and means responsive to the thermal condition of a part of said apparatus for rendering said flow preventing means inoperative to prevent solution circulation.

3. Absorption refrigerating apparatus including a generator, a condenser, an evaporator and an absorber connected to form a plurality of fluid circuits, means for heating said generator, fluid circulating means, means normally tending to prevent circulation of fluid in one of said circuits by said fluid circulating means, control means arranged to render said heating means and said fluid circulating means operative in response to demand for refrigeration, and means for rendering said fluid circulating preventing means inoperative to prevent fluid circulation.

4. Absorption refrigerating apparatus comprising an inert gas circuit including an evaporator and an absorber, a solution circuit including a generator and said absorber, means for liquefying refrigerant vapor produced in said generator and for supplying the liquefied refrigerant to said evaporator, means for heating said generator, power operated means in said inert gas circuit for circulating inert gas therethrough, gas lift pump means in said solution circuit for circulating solution therethrough, means for conducting pumping gas from said inert gas circuit to said gas lift pump means, refrigeration demand responsive means for governing the energization of said power operated means and of said heating means, means having a first position in which it prevents circulation of said solution and a second position in which it does not affect circulation of said solution, and means responsive to a condition of the apparatus produced as an incident to operation of said generator for operating said last mentioned means from said first position to said second position.

5. Absorption refrigerating apparatus comprising an inert gas circuit including an evaporator and an absorber, a solution circuit including a generator and said absorber, means for liquefying refrigerant vapor produced in said generator and for supplying the liquefied refrigerant to said evaporator, means for heating said generator, power operated means in said inert gas circuit for circulating inert gas therethrough, gas lift pump means in said solution circuit for circulating solution therethrough, means for conducting pumping gas from said inert gas circuit to said gas lift pump means, refrigeration demand responsive means for governing the energization of said power operated means and of said heating means, valve means in said pumping gas conducting means for allowing or preventing gas flow to said gas lift pump, and means responsive to the evolution of refrigerant vapor in said generator for operating said valve means to allow flow of pumping gas to said gas lift pump means.

6. Absorption refrigerating apparatus comprising an inert gas circuit including an evaporator and an absorber, a solution circuit including a generator and said absorber, means for liquefying refrigerant vapor produced in said generator and for supplying the liquefied refrigerant to said evaporator, means for heating said generator, power operated means in said inert gas circuit for circulating inert gas therethrough, gas lift pump means in said solution circuit for circulating solution therethrough, means for conducting pumping gas from said inert gas circuit to said gas lift pump means, refrigeration demand responsive means for governing the energization of said power operated means and of said heating means, valve means in said solution circuit for allowing or preventing flow of solution through said solution circuit, and means responsive to the evolution of refrigerant vapor in said generator for operating said valve means to allow circulation of solution.

7. Absorption refrigerating apparatus comprising an inert gas circuit including an evaporator and an absorber, a solution circuit including a generator and said absorber, means for liquefying refrigerant vapor produced in said generator and for supplying the liquefied refrigerant to said evaporator, means for heating said generator, power operated means in said inert gas circuit for circulating inert gas therethrough, gas lift pump means in said solution circuit for circulating solution therethrough, means for conducting pumping gas from said inert gas circuit to said gas lift pump means, refrigeration demand responsive means for governing the energization of said power operated means and of said heating means, a reservoir in said solution circuit connected to the inlet of said gas lift pump means, valve means in said solution circuit for allowing or preventing flow of solution through said solution circuit, and means responsive to the evolution of refrigerant vapor in said generator for operating said valve means to allow circulation of solution, whereby solution is circulated through said absorber from said reservoir while said generator is being heated.

8. Absorption refrigerating apparatus comprising an absorber, a generator, a condenser, an evaporator, means for conveying solution from said absorber to said generator, a solution reservoir, means for conveying solution from said generator to said reservoir, gas lift pump means for conveying solution from said reservoir to said absorber, means connecting said evaporator and said absorber to form a circuit for inert gas, means for conveying refrigerant vapor from said generator to said condenser and for conveying refrigerant liquid from said condenser to said evaporator, inert gas circulating means in said inert gas circuit, means for supplying pumping gas from said inert gas circuit to said gas lift pump means, said evaporator being constructed and arranged to retain refrigerant liquid therein between operative cycles of the apparatus, heating means for said generator, control means for simultaneously rendering said heating means and said inert gas circulating means operative or inoperative in response to refrigeration demand, and means for preventing circulation of solution through said generator until said generator has been heated to evolve refrigerant vapor.

9. Absorption refrigerating apparatus comprising an absorber, a generator, a condenser, an evaporator, means for conveying solution from said absorber to said generator, a solution reservoir, means for conveying solution from said generator to said reservoir, gas lift pump means for conveying solution from said reservoir to said absorber, means connecting said evaporator and said absorber to form a circuit for inert gas, means for conveying refrigerant vapor from said generator to said condenser and for conveying refrigerant liquid from said condenser to said evaporator, inert gas circulating means in said inert gas circuit, means for supplying pumping gas from said inert gas circuit to said gas lift pump means, said evaporator being constructed and arranged to retain refrigerant liquid therein between operative cycles of the apparatus, heating means for said generator, control means for governing the operation of said heating means and said inert gas circulating means, and means for preventing flow of solution from said generator to said reservoir until said generator has been raised to operative temperature by said heating means.

10. Absorption refrigerating apparatus comprising an absorber, a generator, a condenser, an evaporator, means for conveying solution from said absorber to said generator, a solution reservoir, means for conveying solution from said generator to said reservoir, gas lift pump means for conveying solution from said reservoir to said absorber, means connecting said evaporator and said absorber to form a circuit for inert gas, means for conveying refrigerant vapor from said generator to said condenser and for conveying refrigerant liquid from said condenser to said evaporator, inert gas circulating means in said inert gas circuit, means for supplying pumping gas from said inert gas circuit to said gas lift pump means, said evaporator being constructed and arranged to retain refrigerant liquid therein between operative cycles of the apparatus, heating means for said generator, control means for simultaneously energizing or de-energizing said heating means and said inert gas circulating means, and means responsive to a condition produced as an incident of operation of said generator for preventing the supply of pumping gas to said gas lift pump means until said generator has been raised to operative temperature by said heating means.

11. Absorption refrigerating apparatus comprising an absorber, a generator, a condenser, an evaporator, means for conveying refrigerant vapor from said generator to said condenser and for conveying refrigerant liquid from said condenser to said absorber, means connecting said generator and said absorber for circulation of absorption solution including a gas lift circulating pump, means connecting said evaporator and said absorber for circulation of inert gas including a gas circulating pump, means for conducting pumping gas from said inert gas circuit to said gas lift pump, a valve in said last-mentioned means and thermostatic means responsive to the temperature of said refrigerant vapor conveying means for opening said valve when said refrigerant vapor conveying means is warmed by vapor and for closing said valve when said refrigerant vapor conveying means is not warmed by refrigerant vapor.

12. Absorption refrigerating apparatus comprising an absorber, a generator, a condenser, an evaporator, means for conveying refrigerant vapor from said generator to said condenser and for conveying refrigerant liquid from said condenser to said absorber, means connecting said generator and said absorber for circulation of absorption solution including a gas lift circulating pump, means connecting said evaporator and said absorber for circulation of inert gas including a gas circulating pump, means for conducting pumping gas from said inert gas circuit to said gas lift pump, a valve in said solution circulating means, and thermostatic means responsive to the temperature of said generator for opening said valve when said generator is heated sufficiently to evolve refrigerant vapor.

13. Absorption refrigerating apparatus comprising an absorber, a generator, a condenser, an evaporator, means for conveying refrigerant vapor from said generator to said condenser and for conveying refrigerant liquid from said condenser to said absorber, means connecting said generator and said absorber for circulation of absorption solution including a circulating pump, means connecting said evaporator and said absorber for circulation of inert gas, a valve in said solution circulating means, and thermostatic means responsive to the temperature of said generator for opening said valve when said generator is heated sufficiently to evolve refrigerant vapor.

14. Absorption refrigerating apparatus comprising an inert gas circuit including an evaporator and an absorber, a solution circuit including a generator and said absorber, means for liquefying refrigerant vapor produced in said generator and for supplying the liquefied refrigerant to said evaporator, means for heating said generator, power operated means in said inert gas circuit for circulating inert gas therethrough, gas lift pump means in said solution circuit for circulating solution therethrough, means for conducting pumping gas from said inert gas circuit to said gas lift pump means, refrigeration demand responsive means for governing the energization of said power operated means and of said heating means, valve means having a first position in which it prevents circulation of said solution and a second position in which it does not affect circulation of said solution, and thermostatic means positioned to be responsive to a rise in the temperature of a part of the refrigerating apparatus produced as an incident to operation of said generator for operating said valve means from said first position to said second position.

15. Absorption refrigerating apparatus comprising an absorber, a generator, a condenser, an evaporator, means for conveying solution from said absorber to said generator, a solution reservoir, means for conveying solution from said generator to said reservoir, gas lift pump means for conveying solution from said reservoir to said absorber, means connecting said evaporator and said absorber to form a circuit for inert gas, means for conveying refrigerant vapor from said generator to said condenser and for conveying refrigerant liquid from said condenser to said evaporator, inert gas circulating means in said inert gas circuit, means for supplying pumping gas from said inert gas circuit to said gas lift pump means, said evaporator being constructed and arranged to retain refrigerant liquid therein between operative cycles of the apparatus, heating means for said generator, control means for governing the operation of said heating means and said inert gas circulating means, means for preventing circulation of solution until said generator has been heated to evolve refrigerant vapor, and means responsive to the thermal condition of a part of said apparatus for rendering said flow preventing means inoperative to prevent solution circulation.

ARNOLD D. SIEDLE.